(12) United States Patent
Takamine et al.

(10) Patent No.: US 12,306,139 B2
(45) Date of Patent: May 20, 2025

(54) SENSOR MODULE, SENSOR MODULE INSTALLATION DEVICE, AND MOUNTING METHOD OF SENSOR MODULE

(71) Applicant: KABUSHIKI KAISHA TOSHIBA, Tokyo (JP)

(72) Inventors: Hidefumi Takamine, Tokyo (JP); Junko Hirokawa, Tokyo (JP); Kazuo Watabe, Yokohama Kanagawa (JP); Tetsuya Kugimiya, Kawasaki Kanagawa (JP); Keisuke Ueno, Kawasaki Kanagawa (JP); Takashi Usui, Saitama (JP); Yongfang Li, Kawasaki Kanagawa (JP); Yuki Ueda, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 457 days.

(21) Appl. No.: 17/897,451

(22) Filed: Aug. 29, 2022

(65) Prior Publication Data
US 2023/0324345 A1     Oct. 12, 2023

(30) Foreign Application Priority Data

Mar. 22, 2022   (JP) ................. 2022-044949

(51) Int. Cl.
*G01N 29/22*  (2006.01)
*G01N 29/04*  (2006.01)
*G01N 29/28*  (2006.01)

(52) U.S. Cl.
CPC .......... *G01N 29/223* (2013.01); *G01N 29/04* (2013.01); *G01N 29/28* (2013.01)

(58) Field of Classification Search
CPC ...... G01N 29/223; G01N 29/04; G01N 29/28; G01N 29/14; G01N 29/225; G01N 29/226;
(Continued)

(56) References Cited

U.S. PATENT DOCUMENTS

| 2002/0125131 A1* | 9/2002 | Babes-Dornea | ..... G01N 33/005 204/415 |
| 2003/0010129 A1* | 1/2003 | Gu | ......................... G01L 21/12 73/716 |

(Continued)

FOREIGN PATENT DOCUMENTS

| JP | H5-2688 A | 1/1993 |
| JP | 2011-251560 A | 12/2011 |

(Continued)

OTHER PUBLICATIONS

Japanese Patent Office, Decision to Grant a Patent in JP App. No. 2022-044949, 3 pages, and machine translation, 2 pages (Aug. 13, 2024).

*Primary Examiner* — Suman K Nath
(74) *Attorney, Agent, or Firm* — Finnegan, Henderson, Farabow, Garrett & Dunner, LLP

(57) ABSTRACT

A sensor module according to an embodiment includes a sensor; a sensor holder that holds the sensor and includes a pressing force application portion to apply a pressing force to press the sensor toward a measurement target object side; an adhesion portion that adheres the sensor holder to the measurement target object by an adhesion force; and a change mechanism that changes a relative magnitude relationship between the pressing force and the adhesion force.

12 Claims, 10 Drawing Sheets

(58) Field of Classification Search
CPC ... G01N 29/227; G01N 29/4409; G01N 29/50
See application file for complete search history.

(56) References Cited

U.S. PATENT DOCUMENTS

| | | | |
|---|---|---|---|
| 2016/0252418 A1* | 9/2016 | Schoot Uiterkamp | ..................... G01L 9/0051 73/726 |
| 2017/0030787 A1* | 2/2017 | Buck | ..................... G01L 23/10 |
| 2018/0120196 A1 | 5/2018 | Georgeson et al. | |
| 2018/0156670 A1 | 6/2018 | Otsuka et al. | |

FOREIGN PATENT DOCUMENTS

| | | |
|---|---|---|
| JP | 2016-224037 A | 12/2016 |
| JP | 2018-105846 A | 7/2018 |
| JP | 2019-190894 A | 10/2019 |
| WO | WO 2020/162250 A1 | 8/2020 |

* cited by examiner

SENSOR MODULE, SENSOR MODULE INSTALLATION DEVICE, AND MOUNTING METHOD OF SENSOR MODULE

This application is based upon and claims the benefit of priority from Japanese Patent Application No. 2022-044949, filed Mar. 22, 2022; the entire contents of which are incorporated herein by reference.

FIELD

Embodiments of the present disclosure relate to a sensor module, a sensor module installation device, and a mounting method of a sensor module.

BACKGROUND

Conventionally, sensors that are installed on a surface of a measurement target object to perform the measurement and used for infrastructure inspection and diagnosis have been widely used. Particularly, in the measurement using the AE (Acoustic Emission) sensor, it is necessary to maintain a contact state between the sensor surface and the surface of the measurement target object during the measurement, and it is difficult to manage and confirm the contact state.

DETAILED DESCRIPTION

Hereinafter, a sensor module, a sensor module installation device, and a mounting method of a sensor module according to the embodiment will be described with reference to the figures. In the following description, configurations having the same or similar functions are designated by the same reference signs. Then, the duplicate description of these configurations may be omitted.

First Embodiment

Figure 1:
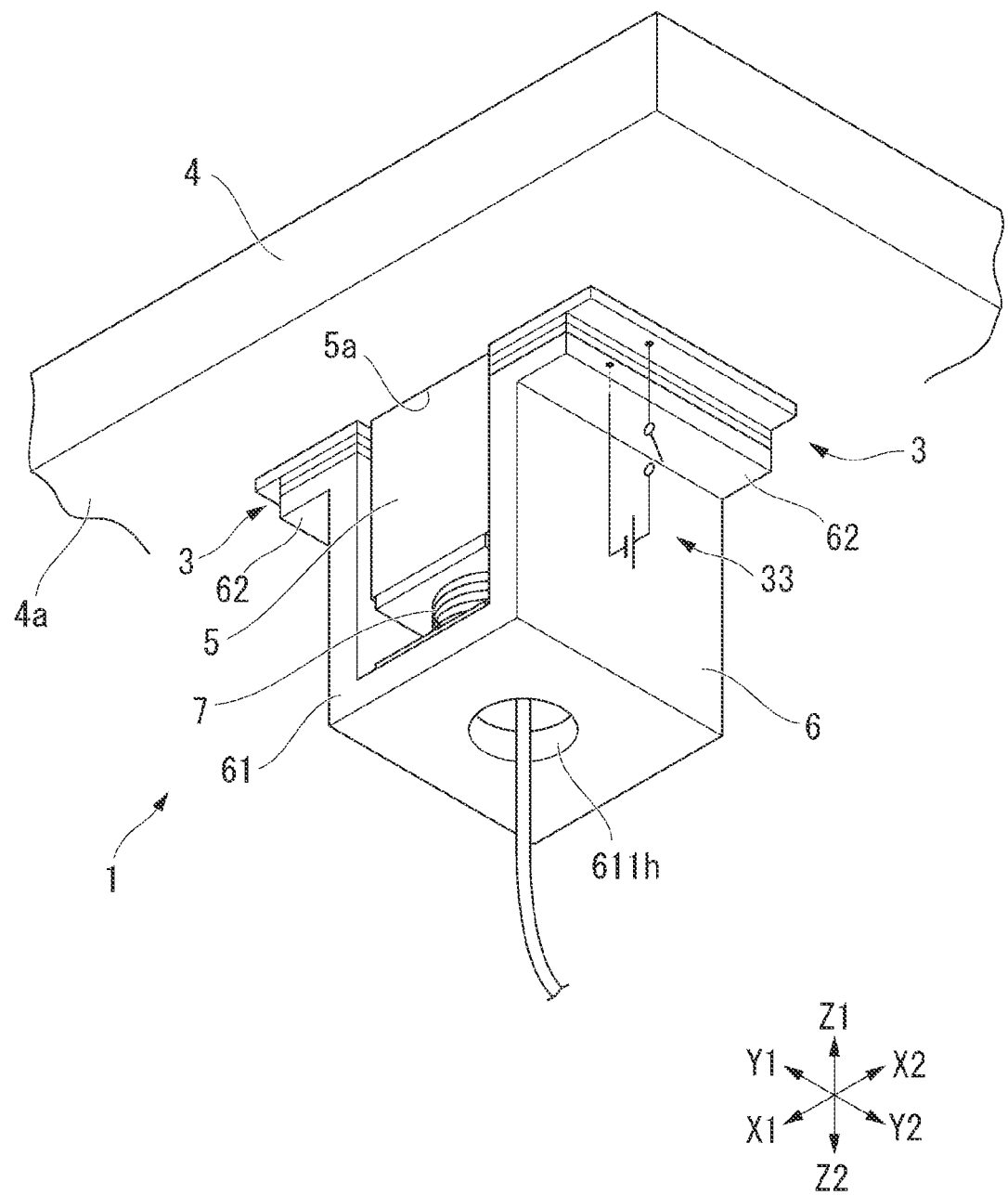
FIG. 1 is a perspective view showing a sensor module according to a first embodiment.

FIG. 1 is a perspective view showing a sensor module 1 according to the present embodiment.

In the following description, the vertical direction is referred to as a direction Z, a contact surface side where the sensor module 1 contacts the measurement target object 4 is referred to as an upper side 21, and the direction opposite to the upper side 21 is referred to as a lower side 22. Furthermore, on a horizontal plane perpendicular to the direction Z, a longitudinal direction of the sensor module 1 is referred to as a direction X (left-right direction), one side thereof is referred to as a left side X1, and the other side is referred to as a right side X2. Furthermore, a short direction of the sensor module 1 orthogonal to the direction X is referred to as a direction Y, one side thereof is referred to as a front side Y1, and the other side is referred to as a rear side Y2.

Hereinafter, a configuration of the sensor module 1 will be described.

The sensor module 1 is a device for adhering a sensor 5 to the measurement target object 4 and maintaining the adhesion between the measurement target object 4 and the sensor 5 during the measurement of the sensor 5. As shown in FIG. 1, the sensor module 1 includes the sensor 5, a sensor holder 2, an adhesive portion 3, and a voltage application portion (change mechanism) 33.

The measurement target object 4 is, for example, a social infrastructure structure such as a bridge, a building or the like. The measurement target object 4 includes a measurement surface 4a that can be measured by the sensor 5 in contact with the lower side 22. Here, according to the present embodiment, the measurement surface 4a is provided on the upper side Z1 when viewed from the sensor 5 in the direction Z, for example. The measurement surface 4a is a ceiling surface of a building or the like provided on a horizontal plane along the direction X and the direction Y. However, the measurement surface 4a is not particularly limited thereto, and may be a floor surface provided on the lower side 22 when viewed from the sensor 5 in the direction Z, or a side wall surface provided in the direction X or the direction Y. The measuring surface 4a may be provided in any direction.

Hereinafter, a configuration of the sensor 5 will be described.

According to the present embodiment, the sensor 5 is a sensor such as an AE sensor (ultrasonic transducer) or the like that contacts the measurement target object 4 to measure cracks, vibrations or the like of the measurement target object 4. The sensor 5 includes a sensor surface 5a on a surface facing the measurement target object. The sensor surface 5a is provided on the upper side Z1. The sensor 5 comes into contact with the sensor surface 5a via a contact catalyst such as a couplant or the like. The sensor surface 5a is installed such that the state of being in contact with the measurement surface 4a of the measurement target object 4 during the measurement is maintained. Furthermore, the sensor 5 includes a lower surface 5b on the lower side 22 on the opposite side of the sensor surface 5a. The sensor 5 is not particularly limited to the AE sensor, and a conventionally known sensor can be adopted.

The sensor 5 is held by the sensor holder 2 and protrudes to the upper side 21 in the direction Z from the sensor holder 2 by an arbitrary protrusion amount without contacting the measurement surface 4a of the measurement target object 4.

Hereinafter, a configuration of the sensor holder 2 will be described.

Figure 2:
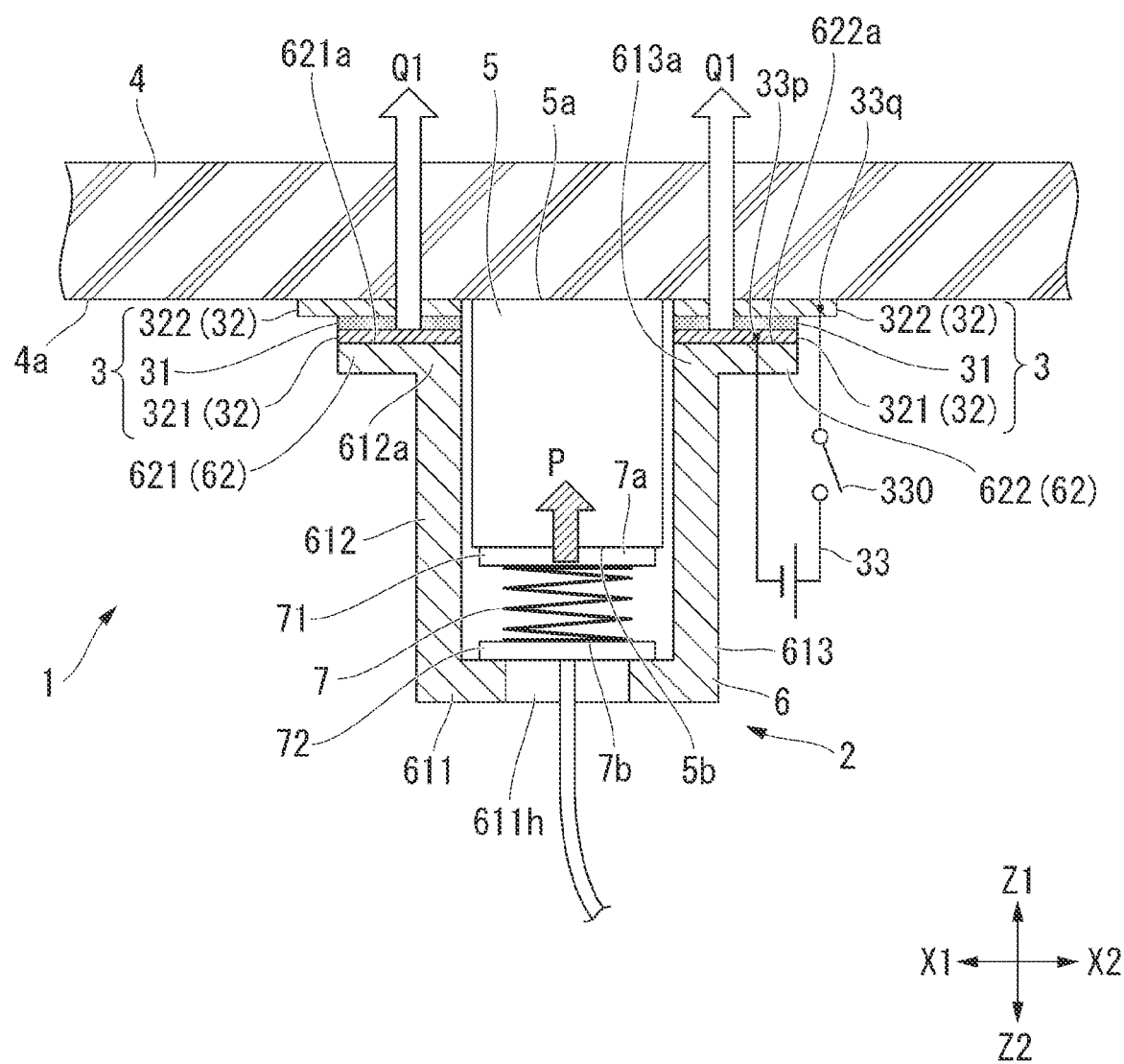
FIG. 2 is a cross-sectional view showing an electrode of the sensor module in FIG. 1 before a voltage is applied (assigned) thereto.
Figure 3:
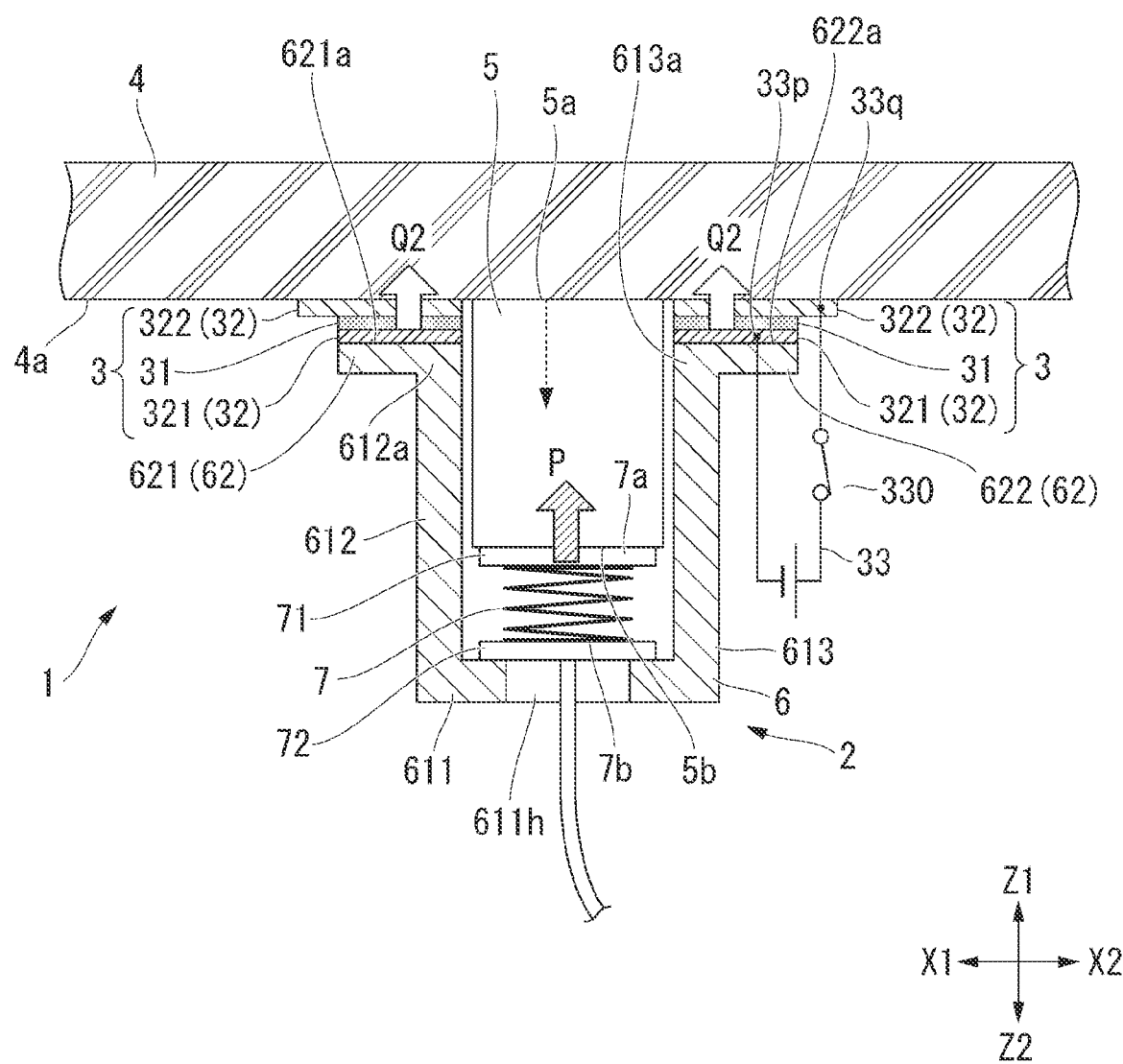
FIG. 3 is a cross-sectional view showing the electrode of the sensor module in FIG. 1 after the voltage is applied (assigned) thereto.

FIG. 2 is a cross-sectional view before a voltage is applied (assigned) to an electrode 32 of the sensor module 1 in FIG. 1. FIG. 3 is a cross-sectional view after the voltage is applied (assigned) to the electrode 32 of the sensor module 1 in FIG. 1.

As shown in FIG. 1 or FIG. 2, the sensor holder 2 includes a sensor holder main body 6 and a pressing force application portion 7.

The sensor holder main body 6 holds the sensor 5. The sensor holder main body 6 includes a sensor holding portion 61 and a mounting portion 62.

As shown in FIG. 2, the sensor holding portion 61 is formed in a substantially U shape having an opening on the upper side Z when viewed from the front side Y1 in the direction Y. The sensor holding portion 61 includes a bottom portion 611, a left holding side wall 612, and a right holding side wall 613.

The bottom portion 611 is a bottom of the sensor holding portion 61. The bottom 611 is provided on the lower side 2 of the sensor 5. The bottom portion 611 is formed in a substantially plate shape on a horizontal plane along the direction X and the direction Y. The bottom portion 611 includes a through hole 611h penetrating in the direction Z. The through hole 611h is provided at the center of the bottom 611.

The left holding side wall 612 is a side wall on the left side X1 of the sensor holding portion 61. The left holding side wall 612 is provided on the left side X1 of the sensor 5. The left holding side wall 612 is formed in a substantially plate shape on a horizontal plane along the direction Z and the direction Y. The left holding side wall 612 is erected on the upper side 21 in the direction Z from an end portion on the left side X1 of the bottom portion 611.

The right holding side wall 613 is a side wall on the right side X2 of the sensor holding portion 61. The right holding side wall 613 is provided on the right side X2 of the sensor 5. The right holding side wall 613 is formed in a substantially plate shape on a horizontal plane along the direction Z and the direction Y. The right holding side wall 613 is erected on the upper side Z1 in the direction Z from an end portion on the right side X1 of the bottom portion 611.

The mounting portion 62 is a portion where the sensor holder 2 and the measurement target object 4 come into contact with each other via the adhesive portion 3. The mounting portion 62 is the uppermost end of the sensor holder 2 in the direction Z. The mounting portion 62 includes a left mounting portion 621 and a right mounting portion 622.

The left mounting portion 621 is formed in a substantially plate shape on a horizontal plane along the direction X and the direction Y. The left mounting portion 621 connects the right end on the right side X2 to the upper end 612a of the left holding side wall 612 and extends toward the left side X1. The left mounting portion 621 includes an adhesive surface 621a on the upper side Z1. The size and shape of the left mounting portion 621 are not particularly limited, and the left mounting portion 621 only has to be formed in a dimension suitable for an electrically peelable adhesive portion 31 and the electrode 32 which will be described later to be mounted thereto.

The right mounting portion 622 is formed in a substantially plate shape on a horizontal plane along the direction X and the direction Y. The right mounting portion 622 connects the left end on the left side X2 to the upper end 613a of the right holding side wall 613 and extends toward the right side X2. The right mounting portion 622 includes an adhesive surface 622a on the upper side 21. Similar to the left mounting portion 621, the size and shape of the right mounting portion 622 are not particularly limited, and the right mounting portion 622 only has to be formed in a dimension suitable for the electrically peelable adhesive portion 31 and the electrode 32 which will be described later to be mounted thereto.

The left mounting portion 621 and the right mounting portion 622 come into contact with the measurement surface 4a of the measurement target object 4 via the adhesive portion 3 described later. According to the present embodiment, the mounting portion 62 includes both the left mounting portion 621 and the right mounting portion 622, however; the mounting portion 62 may include either of the left mounting portion 621 and the right mounting portion 622. Furthermore, the size and shape of the left mounting portion 621 and the right mounting portion 622 may be the same or different from each other.

The pressing force application portion 7 is configured to press the sensor 5 against the upper side 21 as the measurement target object 4 side to apply the pressing force P. The pressing force application portion 7 is, for example, an elastic spring having an arbitrary spring constant. The pressing force application portion 7 includes an upper end portion 7a on the upper side Z1 in the direction Z and a lower end portion 7b on the lower side Z2. The upper end portion 7a is provided with an upper installation plate 71. The upper installation plate 71 comes into contact with the lower surface 5b of the sensor 5 in a state in which the sensor 5 is held by the sensor holder 2. A lower installation plate 72 is provided at the lower end portion 7b of the pressing force application portion 7. The lower installation plate 72 is fixed to the bottom portion 611 at a portion excluding the through hole 611h of the bottom portion 611 of the sensor holder main body 6. However, the upper installation plate 71 and the lower installation plate 72 are not essential configurations. A plurality of pressing force applying portions 7 may be provided.

The pressing force application portion 7 does not provide the pressing force (restoring force) P with respect to the sensor 5 in a state where the sensor 5 does not adhere to the measurement target object 4. When a force is applied to the lower side 22, the pressing force application portion 7 generates the pressing force P that repels in the upper side Z1.

As shown in FIG. 2, when the sensor 5 is held by the sensor holder 2 and the sensor 5 and the measurement target object 4 come into contact with each other, the pressing force application portion 7 moves to the lower side Z2 by the protrusion amount of the sensor 5. At this time, the pressing force application portion 7 contracts in the Direction Z by the same amount as the protrusion amount of the sensor 5 toward the upper side Z1. The pressing force application portion 7 applies the pressing force P to the upper side 21 as a restoring force. The pressing force P is applied to the sensor 5 by the restoring force of the pressing force application portion 7. The sensor holder 2 is applied with a repulsive force to the lower side 22 by the amount of the pressing force P. The pressing force P increases or decreases in proportion to the protrusion amount and the spring coefficient according to a known calculation formula. Any real number can be set for the protrusion amount and the spring coefficient.

Hereinafter, a configuration of the adhesive portion 3 will be described.

As shown in FIG. 1 to FIG. 3, the adhesive portion 3 is configured to adhere the sensor holder 2 to the measurement target object 4 with an adhesive force Q in the direction Z. For the adhesive portion 3, a conventionally known electrically peelable adhesive is adopted. The adhesive portion 3 has an electrically peelable adhesive portion (sheet portion) 31 and the electrode 32.

The electrically peelable adhesive portion (sheet portion) 31 is formed in a sheet shape along a horizontal plane along the direction 2 and the direction Y. The electrically peelable adhesive portion 31 is provided between a first electrode 321 and a second electrode 322 of the electrode 32. The electrically peelable adhesive portion 31 is adhered to the first electrode 321 with an adhesive (not shown) or the like so as to be integrated with the sensor holder 2. The adhesive preferably has a strong adhesive force such that the electrically peelable adhesive portion 31 does not peel off from the first electrode 321.

As shown in FIG. 2 or FIG. 3, the electrode 32 is a sheet of an adhered body having the conductivity that is formed along a horizontal plane along the direction Z and the direction Y. Examples of the adhered body having the conductivity include metals such as aluminum, tin-doped indium oxide, copper, iron, silver, platinum, and gold, and alloys of these metals, for example. The electrode 32 includes the first electrode 321 and the second electrode 322. The electrode 32 may have the conductivity at least in a portion that contacts the electrically peelable adhesive portion 31 and a portion that contacts each terminal of the voltage application portion 33, and the electrode 32 only have to be conductive in these portions. Furthermore, a plurality of electrodes 32 may be provided.

The first electrode 321 is provided on the adhesive surface 621*a* of the left mounting portion 621 and the adhesive surface 622*a* of the right mounting portion 622 of the sensor holder main body 6. The first electrode 321 is adhered to the left mounting portion 621 and the right mounting portion 622 with an adhesive (not shown) or the like so as to be integrated with the sensor holder 2. The first electrode 321 may be provided on either of the left mounting portion 621 or the right mounting portion 622.

The second electrode 322 is adhered to the measurement surface 4*a* of the measurement target object 4 with an adhesive or the like (not shown). The second electrode 322 is arranged on the upper side 21 of the first electrode 321. The first electrode 321, the electrically peelable adhesive portion 31, and the second electrode 322 are arranged from the lower side 22 to the upper side X1 in the direction Z in this sequence to overlap with each other.

When a voltage is applied (assigned) to the first electrode 321 and the second electrode 322 of the adhesive portion 3, a current flows through the electrically peelable adhesive portion 31. The electrically peelable adhesive portion 31 is peeled from the electrode 32. Here, the electrically peelable adhesive portion 31 of the adhesive portion 3 and the first electrode 321 are integrated with the sensor holder 2. Accordingly, the adhesive portion 3 is peeled from between the electrically peelable adhesive portion 31 and the second electrode 322.

Hereinafter, a configuration of the voltage application portion (change mechanism) 33 will be described.

The voltage application portion (change mechanism) 33 is configured to change the relative magnitude relationship between the pressing force P and the adhesive force Q. The voltage application portion 33 applies (assigns) a voltage to the electrode 32 so as to generate a potential difference. Then, the voltage application portion 33 reduces and weaken the adhesive force Q of the adhesive portion 3.

The voltage application portion 33 includes an anode terminal 33*p* and a cathode terminal 33*q*. As shown in FIG. 2 and FIG. 3, the voltage application portion 33 connects each terminal to the electrode 32 in a state of making the sensor holder 2 to be in contact with and mounted to the measurement target object 4. According to the present embodiment, the anode terminal portion 33*p* is electrically connected to the first electrode 321. The cathode terminal 33*q* is electrically connected to the second electrode 322. The anode terminal 33*p* and the cathode terminal 33*q* may be opposite to each other.

For example, the voltage application portion 33 may be provided with a switch 330 for operating to apply (assign) the voltage. The switch 330 operates the voltage application portion 33 into an ON state and an OFF state. The switch 330 is configured to electrically connect the voltage application portion 33 and the electrode 32 when the switch 330 is in the ON state. The switch 330 does not electrically connect the voltage application portion 33 and the electrode 32 when the switch is in the OFF state.

The sensor module 1 according to the present embodiment is configured to relatively change the strength of the adhesive force Q of the adhesive portion 3 with respect to the pressing force P so as to make the sensor 5 and the sensor holder 2 to be attachable to and detachable from the measurement target object 4 when the external force including the pressing force P, the gravity and the like is constant. The adhesive portion 3 can change the strength of the adhesive force Q relative to the pressing force P by the voltage application portion 33.

As shown in FIG. 2, the voltage application portion 33 does not apply (assign) the voltage to the electrode 32 before the measurement target object 4 is mounted to the sensor holder 2 and in a state in which the sensor holder 2 is mounted on the measurement target object 4 for measurement. The adhesive force Q at this time is defined as a first adhesive force Q1. The first adhesive force Q1 is an adhesive force that can maintain the sensor holder 2 so as not to be separated from the measurement target object 4. Specifically, the first adhesive force Q1 is set to be relatively stronger than the force of peeling the sensor holder 2 from the measurement target object 4 (hereinafter referred to as a peeling force) including the repulsive force applying on the sensor holder 2 due to the pressing force P applied to the measurement target object 4 by the pressing force application portion 7, the gravity of the sensor 5 and the sensor holder 2 (not shown), and the external force applying on the lower side 22 such as wind and vibration generated during the measurement.

Further, as shown in FIG. 3, when the measurement by the sensor 5 is completed and the voltage is applied (assigned) to the adhesive portion 3 by the switch 330 of the voltage application portion 33, the electrode 32 is energized. In the adhesive portion 3, the voltage is applied between the first electrode 321 on the lower side Z2 and the second electrode 322 on the upper side 21, and the current flows through the electrically peelable adhesive portion 31. The electrically peelable adhesive portion 31 is peeled from the electrode 32. Here, the electrically peelable adhesive portion 31 of the adhesive portion 3 and the first electrode 321 are integrated with the sensor holder 2. Accordingly, the adhesive portion 3 is peeled from between the electrically peelable adhesive portion 31 and the second electrode 322. Therefore, the adhesive strength Q of the adhesive portion 3 decreases. The adhesive force Q at this time is referred to as the second adhesive force Q2. The second adhesive force Q2 is weaker than the first adhesive force Q1. Furthermore, the second adhesive force Q2 is weaker than the peeling force. Therefore, the sensor 5 and the sensor holder 2 are detached from the measurement target object 4 by the peeling force.

Hereinafter, the effect of the sensor module 1 will be described.

The sensor module 1 is installed on the measurement target object 4 as shown in FIG. 1. The pressing force application portion 7 of the sensor module 1 provides a pressing force P on the upper side 21 in the direction Z in a state in which the sensor 5 is held by the sensor holder 2 while the sensor 5 and the measurement target object 4 are in contact with each other. At this time, for example, if there is no adhesive portion 3 provided, the sensor 5 and the sensor module 1 will fall due to the gravity or the like. According to the present embodiment, by providing the adhesive portion 3, the sensor module 1 is adhered to the measurement target object 4, and the holding state of the sensor 5 and the sensor module 2 is maintained. The adhesive portion 3 has the first adhesive force Q1. The first adhesive force Q1 is stronger than the above-mentioned peeling force. The first adhesive force Q1 is the adhesive force that can maintain the sensor holder 2 so as not to be separated from the measurement target object 4. In this state, the switch 330 of the voltage application portion 33 of the adhesive portion 3 is in the OFF state, and the voltage is not applied (assigned) to the electrode 32. The sensor 5 measures the cracks, the vibrations and the like with the above-described configuration.

As shown in FIG. 3, the sensor module 1 turns the switch 330 of the voltage application portion 33 of the adhesive portion 3 into the ON state when the measurement of the sensor 5 is completed and removed. Then, the voltage application portion 33 of the adhesive portion 3 applies (assigns) the voltage to the electrode 32. The voltage is applied between the first electrode 321 and the second electrode 322, and a current flows through the electrically peelable adhesive portion 31 sandwiched therebetween in the direction Z. The electrically peelable adhesive portion 31 is peeled from the electrode 32. Here, the electrically peelable adhesive portion 31 of the adhesive portion 3 and the first electrode 321 are integrated with the sensor holder 2. Accordingly, the adhesive portion 3 is peeled from between the electrically peelable adhesive portion 31 and the second electrode 322. The adhesive strength Q of the adhesive portion 3 decreases to become the second adhesive strength Q2. The second adhesive force Q2 is relatively weaker than the above-described peeling force. Accordingly, the sensor 5 and the sensor holder 2 are detached from the measurement target object 4 by the peeling force.

According to the present embodiment, since the bottom portion 611 of the sensor holding portion 61 includes a through hole 611$h$ penetrating in the direction Z, the sensor 5 is pushed into the upper side 21 from the through hole 611$h$ by a hand, a rod-shaped member or the like such that it is possible to make the sensor surface 5$a$ of the sensor 5 and the measurement surface 4$a$ of the measurement target object 4 to be definitely contact with each other and improve the adhesion. Also, in a case in which the pressing force application portion 7 and the lower installation plate 72 have a hole penetrating in the direction Z at a position overlapping the through hole 611$h$ in the direction Z similar to the bottom portion 611, it is possible to insert the power cables or the like of the sensor 5 (not shown) through the through hole 611$h$.

According to the present embodiment, since the sensor holder main body 6 of the sensor holder 2 includes the mounting portion 62, the sensor holder 2 does not fall due to gravity even without directly attaching the adhesive, the adhesive tape or the like to the sensor 5, and it is possible to mount the sensor 5 to the ceiling surface as the measurement surface 4$a$.

According to the present embodiment, since the sensor holder 2 includes the pressing force application portion 7, it is possible for the sensor 5 to apply the pressing force P to the measurement target object 4 to press against the measurement target object 4. Therefore, it is possible for the sensor 5 to perform the measurement while maintaining the state in which the sensor surface 5$a$ is in contact with the measurement surface 4$a$ even if the measurement target object 4 vibrates.

According to the present embodiment, the sensor module 1 presses the sensor 5 against the measurement target object 4 by applying the pressing force P by the pressing force application portion 7, and adheres the sensor 5 and the sensor holder 2 by the adhesive portion 3 so as to be maintained not to be separated from the measurement target object 4.

According to the present embodiment, the adhesive force Q of the adhesive portion 3 is changed from the first adhesive force Q1 to the second adhesive force Q2 with respect to the peeling force by the voltage application portion 33. That is, it is possible for the voltage application portion 33 to change the strength of the adhesive force Q of the adhesive portion 3. Therefore, the sensor 5 and the sensor holder 2 may be configured to be attachable to and detachable from the measurement target object 4. Furthermore, the sensor module 1 can easily manage the relationship between the pressing force P and the adhesive force Q.

According to the present embodiment, it is possible to separate the sensor 5 and the sensor holder 2 from the measurement target object 4 in a short time by applying (assigning) the voltage to the adhesive portion 3 by using the electrically peelable adhesive.

According to the present embodiment, it is possible to reduce the burden of the sensor installation operation, and the sensor 5 can be easily separated from the measurement target object 4. Furthermore, since the sensor module 1 can be used repeatedly only by replacing the electrically peelable adhesive, it is possible to stably perform the sensor installation operation at a low cost.

Second Embodiment

Hereinafter, a sensor module installation device including a sensor module according to a second embodiment will be described with reference to FIG. 4 and FIG. 5.

In these figures, the same configuration elements same as the elements according to the first embodiment as shown in FIG. 1 to FIG. 3 are designated by the same reference signs, and the description thereof will be omitted.

Figure 4:
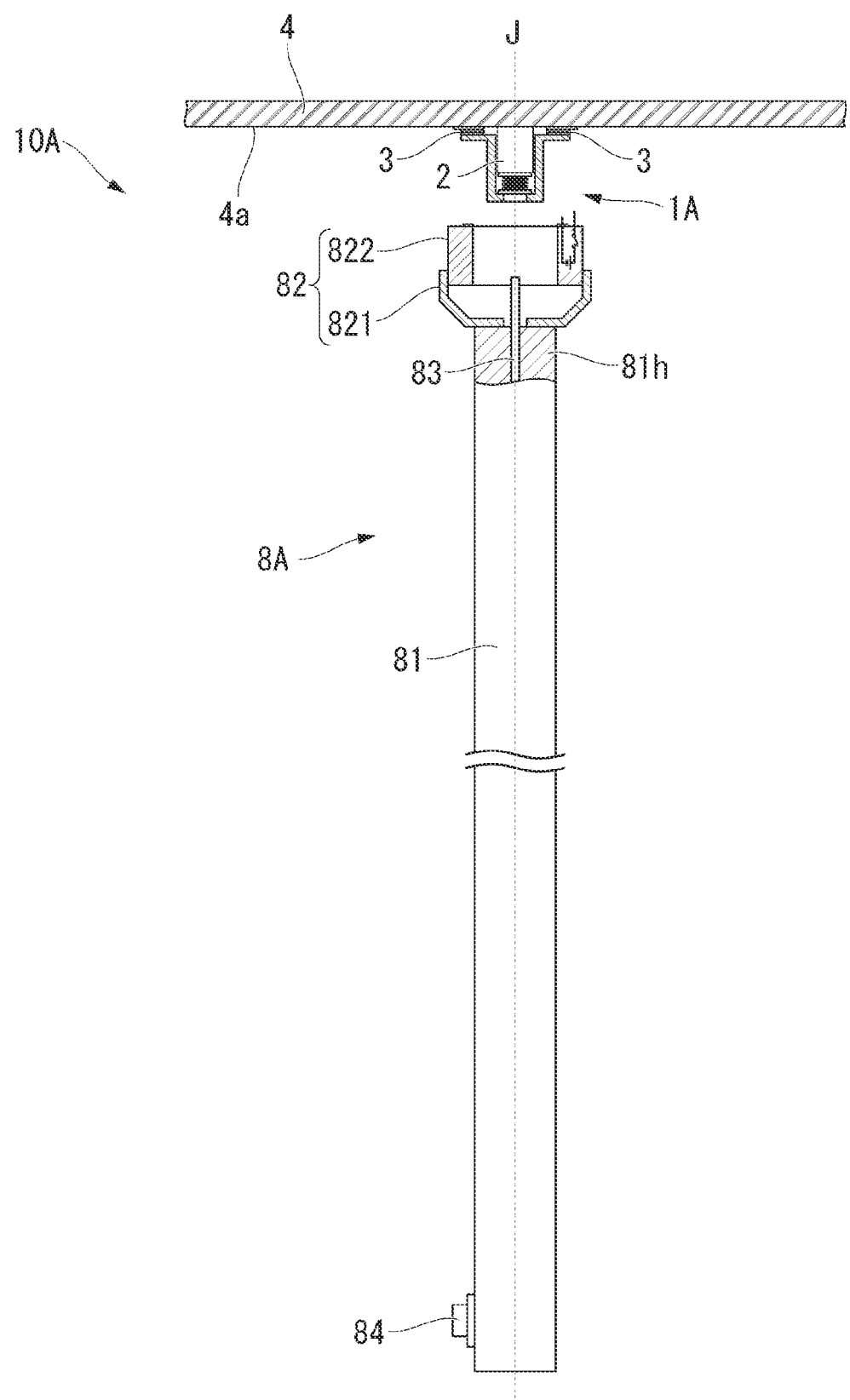
FIG. 4 is a side view showing a sensor module installation device according to a second embodiment.
Figure 5:
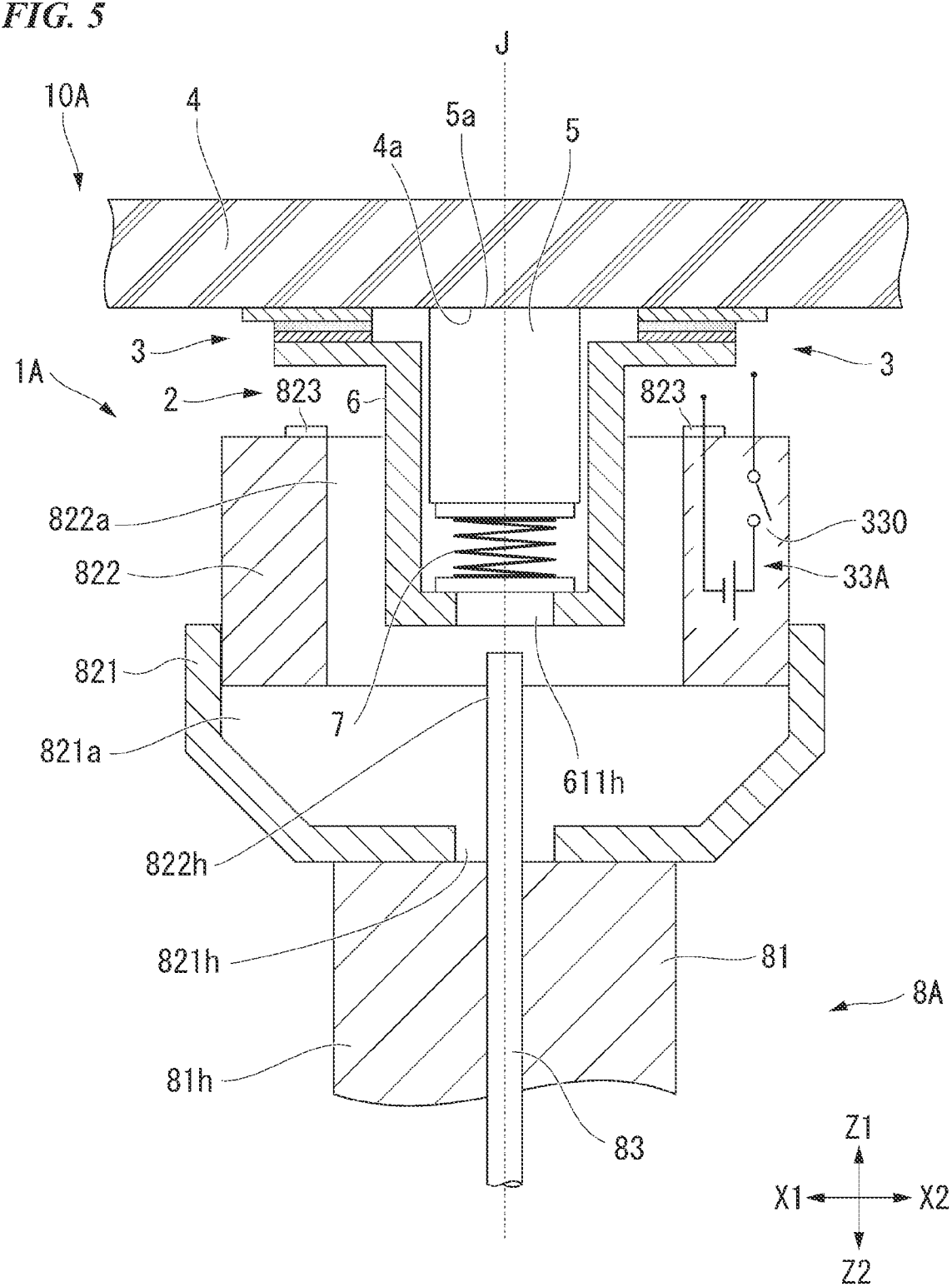
FIG. 5 is an enlarged view showing a sensor module of the sensor module installation device in FIG. 4.

FIG. 4 is a side view of a sensor module installation device 10A according to the second embodiment. FIG. 5 is an enlarged view of the sensor module 1A of the sensor module installation device 10A in FIG. 4.

The sensor module installation device 10A includes a sensor module gripping portion 8A and a sensor module 1A.

Hereinafter, a configuration of the sensor module gripping portion 8A will be described.

As shown in FIG. 4, it is possible for the sensor module gripping portion 8A to grip and detach the sensor module 1A. Here, the sensor module gripping portion 8A includes a central axis J along the direction Z. The sensor module gripping portion 8A includes a support portion 81, a cup portion 82, a voltage application portion (change mechanism) 33A, and a rod-shaped member 83.

The support portion 81 supports the cup portion 82 provided on the upper side Z1. The support portion 81 extends along the central axis J and is formed in a substantially rod-cylindrical shape. The support portion 81 includes a hollow portion 81h through which a rod-shaped member, a wiring cable, or the like, which will be described later, are insertable. The support portion 81 includes an operation portion 84 on the side surface of the support portion 81.

The operation portion 84 is configured to be able to operate the switch 330 of the voltage application portion 33A. The operation portion 84 is mounted to the lower side 22 of the support portion 81. The operation portion 84 may wirelessly operate the switch 330 of the voltage application portion 33A remotely, or may electrically connect to the voltage application portion 33A using a wired cable.

The cup portion 82 is configured to grip the sensor module 1A. The cup portion 82 includes a first cup portion 821 and a second cup portion 822.

The first cup portion 821 is provided on the upper side 21 of the support portion 81. The first cup portion 821 has a concave portion 821a in which the upper side 21 in the direction Z is opened. The first cup portion 821 is formed in a substantially cup shape in a circumferential direction along the central axis J. The concave portion 821a is formed in a dimension sufficient to grip the second cup portion 822 and the sensor module 1A. The first cup portion 821 is provided with a through hole 821h in the lower side Z2. The diameter of the through hole 821h is larger than the outer diameter of the rod-shaped member 83 described later.

The support portion 81 can freely change an angle formed by the lower surface 821b and the support portion 81 with the upper end portion 81a as a base point with respect to the lower surface 821b of the first cup portion 821. Accordingly, according to the present embodiment, the sensor module gripping portion 8A can align the sensor module 1A installed in the cup portion 82 with the measurement target object 4 at a flexible angle.

The second cup portion 822 is provided on the upper side Z1 above the first cup portion 821. In the second cup portion 822, the lower side 22 is fixed to the first cup portion 821. The second cup portion 822 has a concave portion 822a in which the upper side 21 in the direction Z is opened, similarly to the first cup portion 821. The second cup portion 822 is formed in a substantially cup shape in the circumferential direction along the central axis J. The concave portion 822a is formed in a dimension sufficient to grip the sensor module 1A. The second cup portion 822 is provided with a through hole 822h in the lower side Z2. The through hole 822h may have the same size as the through hole 821h, or may be a hole through which the rod-shaped member 83 described later can penetrate. The second cup portion 822 includes a sticking portion 823. The first cup portion 821 and the second cup portion 822 may be integrated.

The voltage application portion (change mechanism) 33A changes the relative magnitude relationship between the pressing force P and the adhesive force Q. The voltage application portion 33A has the same configuration as the voltage application portion 33 provided in the sensor module 1 according to the first embodiment. The voltage application portion 33A described above is provided on the side surface of the second cup portion 822, for example. As shown in FIG. 5, the voltage application portion 33A brings the sensor module gripping portion 8A to approach the sensor module 1A and the measurement target object 4 in a state in which the sensor module 1A is mounted to the measurement target object 4. At this time, the voltage application portion 33A makes each terminal into contact with the electrode 32. The switch 330 for controlling the ON/OFF state of the voltage application portion 33A is operated by the operation portion 84.

The sticking portion 823 is provided on the upper surface of the upper side 21 of the second cup portion 822. The sticking portion 823 is an adhesive tape having an adhesive force smaller than the first adhesive force Q1 and larger than the second adhesive force Q2. The sticking portion 823 may be stuck on a part of the upper surface of the second cup portion 822, or may be stuck on the whole thereof.

The rod-shaped member 83 is inserted into the hollow portion 81h of the support portion 81. The rod-shaped member 83 is installed so as to be advanceable and retractable in the direction Z. The upper end portion 83a of the rod-shaped member 83 is inserted through the through hole 611h of the sensor module 1A, and the sensor 5 is pushed into the upper side 21 on the measurement target object 4 side via the lower installation plate 72. The operator can further apply a pressing force P to the sensor 5, for example, by advancing and retracting the rod-shaped member 83 up and down while holding the support portion 81. Therefore, the rod-shaped member 83 can definitely bond the sensor 5 and the measurement target object 4 by applying the pressing force P, and it is possible to accurately measure the measurement target object 4.

The configuration of the sensor module 1A is the same as that of the first embodiment, except that the sensor module 1A does not include the voltage application portion 33 provided in the sensor module 1 according to the first embodiment. The central axis of the sensor module 1A substantially coincides with the central axis J of the sensor module gripping portion 8A.

Hereinafter, the effect of the sensor module installation device 10A will be described. Since the effect of the sensor module 1A is the same as that of the first embodiment, the description thereof will be omitted.

The sensor module gripping portion 8A moves the sensor module 1A to the measurement surface 4a of the measurement target object 4 while gripping the sensor module 1A by the cup portion 82. The sensor module 1A is mounted to the measurement target object 4 by being adhered by the adhesive portion 3 on the measurement surface 4a of the measurement target object 4. At this time, the sensor module 1A can be installed more reliably by advancing and retracting the rod-shaped member 83 in the direction Z and pressing the sensor 5 by the operator.

After the sensor module 1A is installed on the measurement surface 4a of the measurement target object 4, only the sensor module gripping portion 8A is removed.

The sensor module 1A is gripped by the sensor module gripping portion 8A when the measurement of the sensor 5 is completed and the sensor module 1A is removed. At this time, each terminal of the voltage application portion 33A is brought into contact with the electrode 32 and electrically connected. When the switch 330 of the voltage application portion 33A of the adhesive portion 3 is turned into the ON state by the operation portion 84, the adhesive portion 3 can apply a voltage between the upper and lower electrodes 32 as in the first embodiment. By applying the voltage between the electrodes 32, the voltage is applied to the electrically peelable adhesive portion 31 to reduce the adhesive force Q to the second adhesive force Q2, and the sensor module 1A can be detached.

According to the present embodiment, by the operator performing the operation holds the support portion 81, it is possible to install the sensor module 1A to the cup portion 82 provided on the upper side 21, and it is easy to mount the sensor module 1A to the ceiling at a high place.

According to the present embodiment, it is easy for the operator to remove the sensor module 1A from a high position such as the ceiling surface that cannot be reached by using the sensor module gripping portion 8A again.

According to the present embodiment, since the sensor holder 2 is provided with the pressing force application portion 7, it is possible to press the sensor 5 against the measurement target object 4 by applying the pressing force P. Therefore, the sensor 5 can perform the measurement while maintaining the state in which the sensor surface 5a is in contact with the measurement surface 4a even if the measurement target object 4 vibrates.

According to the present embodiment, the sensor module 1A is configured to adhere the sensor 5 and the sensor holder 2 by the adhesive portion 3 while pressing the sensor 5 against the measurement target object 4 by applying the pressing pressure P by the pressing pressure applying portion 7 so as not to be separated from the measurement target object 4.

According to the present embodiment, the adhesive force Q of the adhesive portion 3 is changed from the first adhesive force Q1 to the second adhesive force Q2 with respect to the peeling force by the voltage application portion 33. That is, the voltage application portion 33 can change the strength of the adhesive force Q of the adhesive portion 3. Therefore, it is possible to configure the sensor 5 and the sensor holder 2 to be detachable from the measurement target object 4. Further, the sensor module 1A can easily manage the relationship between the pressing force P and the adhesive force Q.

According to the present embodiment, since the operation portion 84 is mounted to the support portion 81, the operator holding the support portion 81 can easily operate the switch 330 of the voltage application portion 33A of the sensor module 1A provided on the upper side Z1. Therefore, the voltage application portion 33A can be easily operated even if the sensor module 1A is installed in a range that is out of the reach of the operator, such as a ceiling high in the direction Z. Also, the sensor module 1A can remove the sensor 5 and the sensor holder 2 from the target measurement target object 4 within a short time.

According to the present embodiment, since the cup portion 82 includes the sticking portion 823, it is possible to prevent the sensor module 1A from coming off from the cup portion 82 when the sensor module 1A is mounted. Further, the adhesive strength of the sticking portion 823 is smaller than the first adhesive strength Q1. Therefore, when the sensor module 1A is pressed against the measurement surface 4a of the measurement target object 4 and a sufficiently strong first adhesive force Q1 is formed between the sensor module 1A and the measurement target object 4, it is possible to remove the sensor module gripping portion 8A only to install the sensor module 1A to the measurement target object 4.

According to the present embodiment, when the adhesive force between the sensor module 1A and the measurement surface 4a of the measurement target object 4 is the second adhesive force Q2, it is easy to remove the sensor module from the measurement target object 4.

(Modification Example)

The voltage application portion may be provided in the sensor module instead of being provided in the sensor module gripping portion.

Third Embodiment

Hereinafter, a sensor module installation device provided with a sensor module according to a third embodiment will be described with reference to FIG. 6 to FIG. 8.

In these figures, the same components as the configuration components according to the first embodiment and the second embodiment as shown in FIG. 1 to FIG. 5 are designated by the same reference signs, and the description thereof will be omitted.

Figure 6:
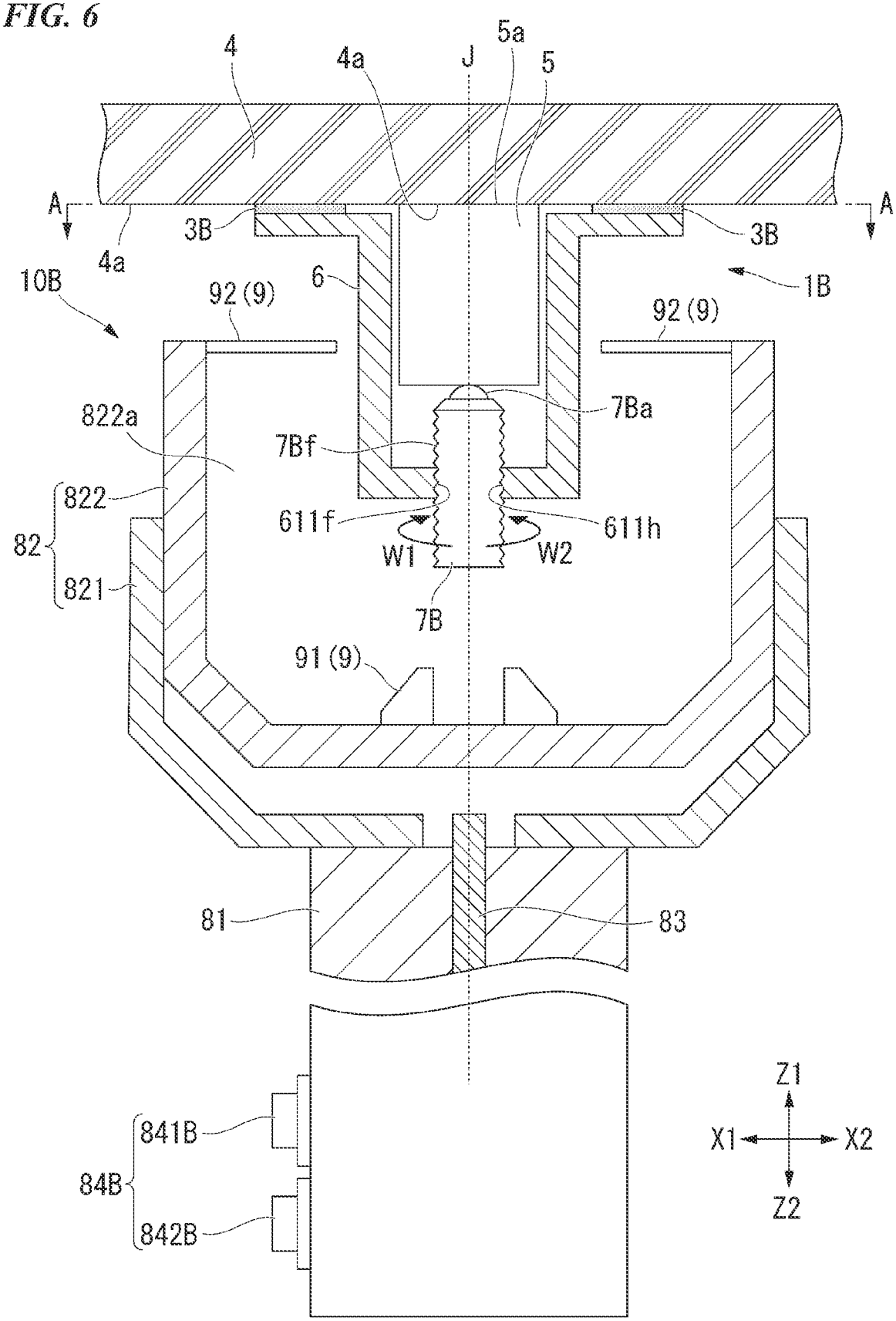
FIG. 6 is an enlarged cross-sectional view showing a sensor module of a sensor module installation device according to a third embodiment.

FIG. 6 is an enlarged cross-sectional view of a sensor module 1B of a sensor module installation device 10B according to the third embodiment. FIG. 7 is a view showing a state in which a cross section A-A of the sensor module installation device 10B in FIG. 6 is viewed from the upper side Z1. FIG. 8 is a view showing a state in which a blade 92 of the sensor module installation device 10B in FIG. 6 is inserted into the adhesive portion 3B.

The sensor module installation device 10B has a sensor module gripping portion 8B and a sensor module 1B. The sensor module gripping portion 8B includes a support portion 81, a cup portion 82, a change mechanism 9, and a rod-shaped member 83. Further, the support portion 81 includes an operation portion 84B. The operation portion 84B includes an operation portion 841B capable of operating a rotation ON-OFF switch of the plunger gripping portion 91, which will be described later, and an operation portion 842B capable of operating the rotational ON-OFF switch of the blade 92.

Hereinafter, a configuration of the change mechanism 9 will be described.

The change mechanism 9 changes the relative magnitude relationship between the pressing force P and the adhesive force Q. The change mechanism 9 includes the plunger gripping portion 91 and the blade 92.

The plunger gripping portion 91 applies a predetermined torque to a plunger 7B described later. The plunger gripping portion 91 is provided at the bottom of the concave portion 822a of the second cup portion 822. The plunger gripping portion 91 is rotated by the operation portion 841B to apply the predetermined torque to the plunger 7B. The size and shape of the plunger gripping portion 91 are not particularly limited and the plunger gripping portion 91 only has to be able to grip the plunger 7B to apply the torque. Also, the plunger gripping portion 91 may be manually rotated.

Figure 7:
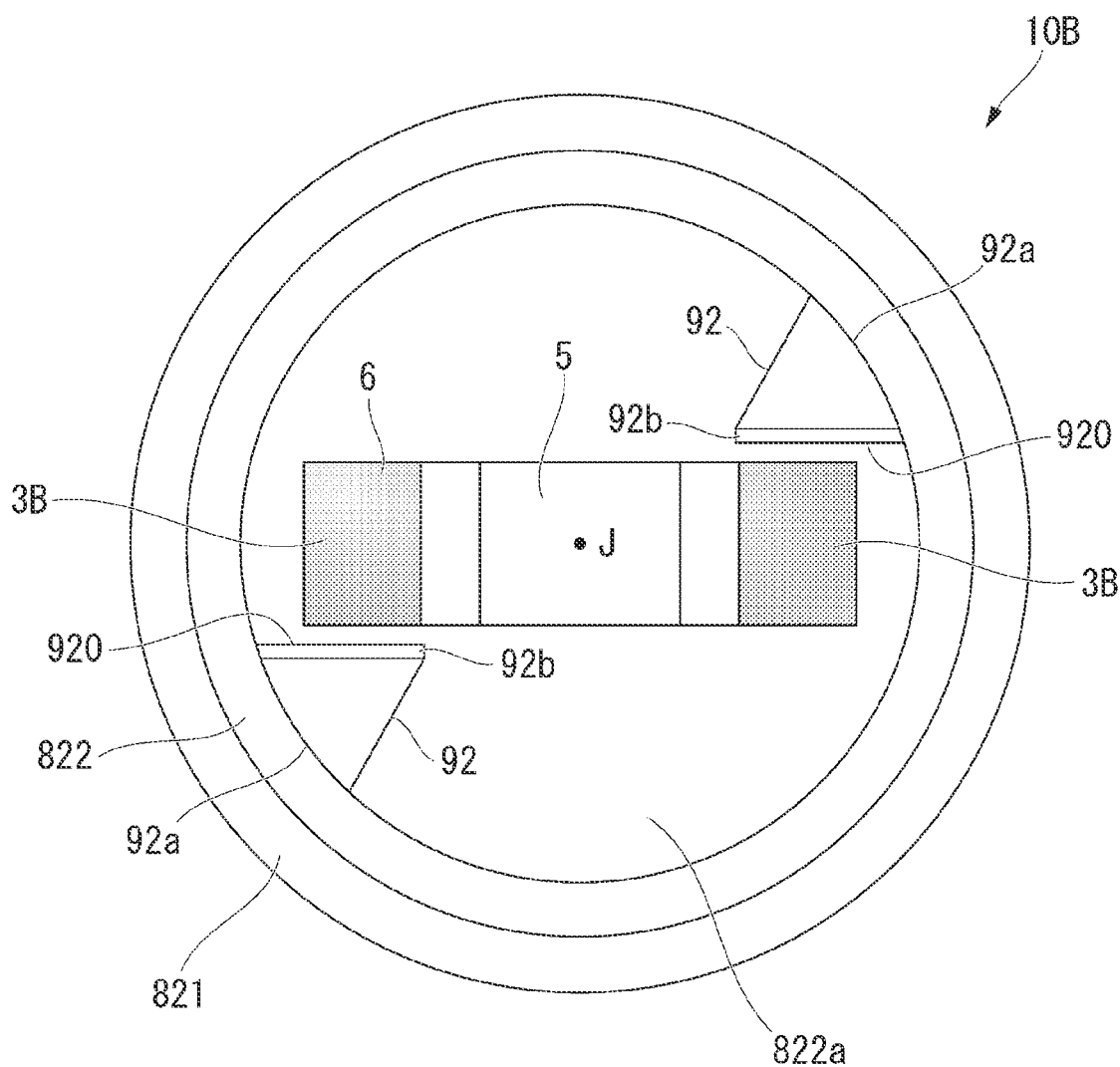
FIG. 7 is a view showing a state of a cross section A-A of the sensor module installation device in FIG. 6 from an upper side.
Figure 8:
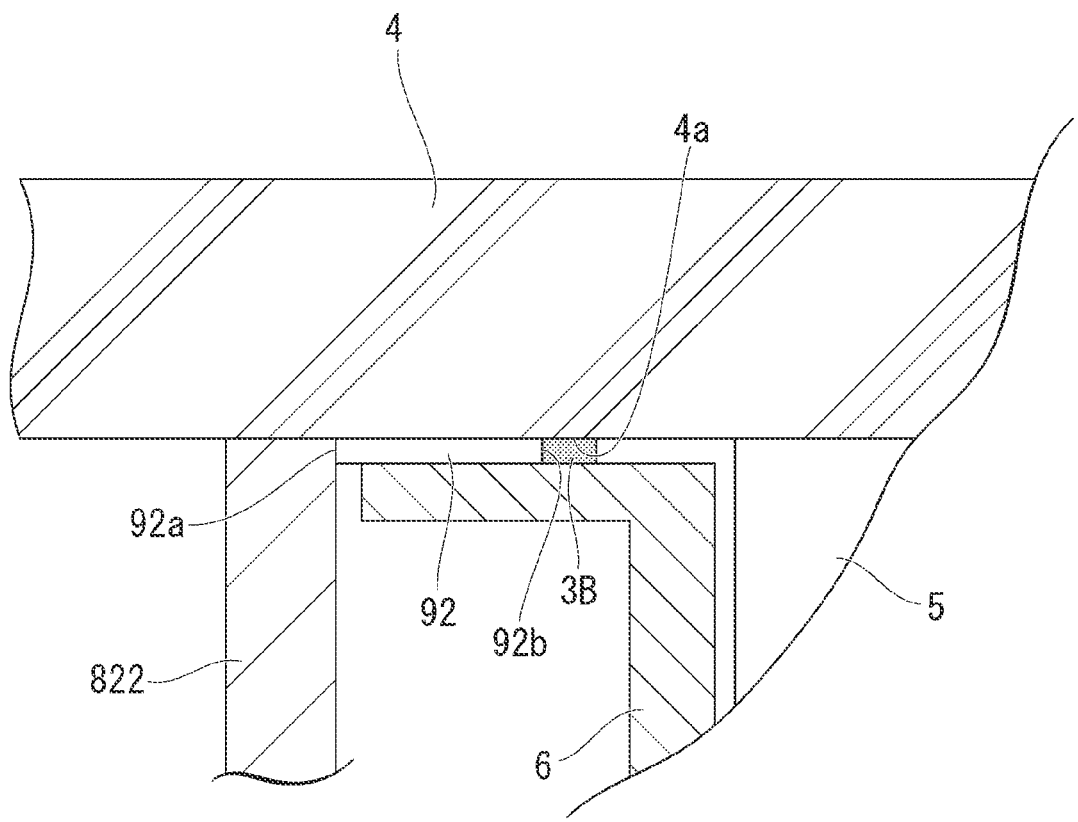
FIG. 8 is a view showing a state in which a blade of the sensor module installation device in FIG. 6 is inserted into an adhesion portion.
Figure 8:
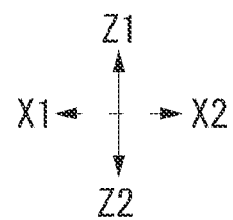

As shown in FIG. 7 and FIG. 8, the blade 92 is provided so as to be insertable into the adhesive portion 3B. As shown in FIG. 7, the blade 92 is provided with a cutting edge 920 on one side in the circumferential direction along the central axis J, and the blade 92 is formed in a substantially triangular shape with the cutting edge 920 as one side. For example, two blades 92 are provided and the blades 92 are formed on both sides of the left side X1 and the right side X2 with the central axis J therebetween. A base end portion 92a of the blade 92 is connected to the upper edge portion of the concave portion 822a of the second cup portion 822. As shown in FIG. 7, the blade 92 is formed such that the width of the central axis J in the circumferential direction decreases from the base end portion 92a toward the tip end portion 92b. Also, as shown in FIG. 8, the blade 92 extends from the base end portion 92a such that the tip thereof faces the central axis J. When the blade 92 is rotated to one side in the circumferential direction along the central axis J by the operation portion 842B of the sensor module gripping portion 8B, the cutting edge 920 is inserted into the adhesive portion 3B from one side in the circumferential direction. Then, the blade 92 is inserted into the adhesive portion 3B to scrape the adhesive portion 3B so as to decrease and weaken the adhesive force Q. The number of blades 92 is not particularly limited. Also, the size and shape of the blade 92 are not particularly limited. The blade 92 may be in a substantially donut shape formed as a whole along the circumferential direction along the central axis J, for example. Also, the cutting edge 920 is not an essential configuration.

Hereinafter, the configuration of the sensor module 1B will be described.

As shown in FIG. 6, the sensor module 1B includes a sensor 5, a sensor holder 2B, and an adhesive portion 3B. The sensor 5 has the same configuration as that of the first to second embodiments.

Hereinafter, a configuration of the sensor holder 2B will be described.

As shown in FIG. 6, the sensor holder 2B includes a sensor holder main body 6 and a plunger (pressing pressure applying portion) 7B. The sensor holder main body 6 has the same configuration as that of the first embodiment. Here, the through hole 611h provided in the bottom portion 611 of the sensor holding portion 61 is a screw hole provided on the inner side surface with a female screw portion 611f to be screwed with the plunger 7B described later.

The plunger (pressing pressure applying portion) 7B is provided in the through hole 611h. The plunger 7B includes a male screw portion 7Bf that is screwed with the female screw portion 611f of the through hole 611h. The plunger 7B is screwed into the through hole 611h to be advanceable and retractable in the direction Z. The plunger 7B advances and retreats in the direction Z to apply a pressing force P to the sensor 5.

According to the present embodiment, the plunger 7B is provided in the sensor holder main body 6 such that the through hole 611h comes in the middle in the direction Z. Also, in the plunger 7B, the sensor 5 is placed on the upper side Z1. At this time, the upper surface of the sensor 5 and the upper surface of the sensor holder 2B have substantially the same height. The sensor module 1B is mounted to the measurement target object 4 in this state. However, not limited to the above-described configuration, the sensor 5 may be placed on the lower side 22 with respect to the upper surface of the sensor holder 2B.

When the plunger 7B advances to the upper side Z1 in the direction Z, the sensor 5 can be pushed by the tip portion 7Ba provided on the upper side 21 of the plunger 7B. At this time, the plunger 7B presses the sensor 5 against the measurement target object 4 to apply the pressing force P. The pressing force P at this time is defined as a first pressing force PB1. Also, the plunger 7B presses the sensor 5 against the measurement target object 4 to apply a second pressing force PB2 stronger than the first pressing force PB1. The second pressing force PB2 is stronger than the first adhesive force QB1 described later. Also, when the plunger 7B retreats to the lower side Z2 in the direction Z, each pressing force P applied may be weakened. Here, the length of the plunger 7B in the direction Z is not particularly limited; however, it is preferable that in a state in which the plunger 7B is advanced to the upper side 21 to push in the sensor 5, the lower side Z2 of the plunger 7B sufficiently protrudes from the through hole 611h and the plunger 7B has a length sufficient such that the plunger gripping portion 91 described later can apply the torque.

When the plunger 7B is turned to one side W1 in the circumferential direction along the central axis J, the plunger gripping portion 91 advances the plunger 7B to the upper side Z1 in the direction Z. The plunger 7B can push the sensor 5 and apply the pushing pressure P. Also, the plunger gripping portion 91 retracts the plunger 7B when the plunger 7B is turned to the other side W2 in the direction opposite to one side W1 in the circumferential direction along the central axis J. Accordingly, the plunger 7B can decrease and weaken the pressing force P. However, the rotation direction is not particularly limited, and the one side W1 and the other side W2 may be configured in opposite directions.

Hereinafter, a configuration of the adhesive portion 3B will be described.

For the adhesive portion 3B, for example, a conventionally known adhesive or adhesive tape is used. The adhesive portion 3B is provided between the sensor holder 2B and the measurement surface 4a of the measurement target object 4. The adhesive portion 3B is previously applied or attached to the sensor holder 2B or the measurement surface 4a of the measurement target object 4, and when the sensor 5 and the sensor holder 2B are mounted, then sensor holder 2B is adhered to the measurement target object 4 with the first adhesive force QB1 that is stronger than the peeling force including the first pressing force PB1. It is preferable that the adhesive portion 3B has a height such that the blade 92 can be inserted in the direction Z. When the adhesive portion 3B is scraped by the blade 92, the adhesive force Q becomes the second adhesive force QB2 whose adhesive force Q is weaker than the first pressing pressure PB1.

Similar to the above-described embodiment, the sensor module 1B according to the present embodiment changes the relative magnitude relationship between the pressing force P and the adhesive force C with respect to the measurement target object 4, such that the sensor 5 and the sensor holder 2 can be attached to and detached from the measurement target object 4.

According to the present embodiment, the plunger 7B is configured such that the sensor 5 and the sensor holder 2B can be attached to and detached from the measurement target object 4 by changing the magnitude relationship of the pressing force P when the adhesive force Q of the adhesive portion 3B is constant. The plunger 7B can press the sensor 5 against the measurement target object 4 to apply the first pressing force PB1. The first pressing force PB1 is weaker than the first adhesive force QB1. Also, the plunger 7B can further press the sensor 5 against the measurement target object 4 to apply the second pressing force PB2. The second pressing force PB2 is stronger than the first pressing force PB1 and stronger than the first adhesive force QB1. Accordingly, the sensor 5 and the sensor holder 2B can be detached from the measurement target object 4 by the peeling force.

According to the present embodiment, when the pressing force P of the plunger 7B is constant, the adhesive portion 3B may be configured to change the magnitude relationship of the adhesive force Q such that the sensor 5 and the sensor holder 2B are attachable to and detachable from the measurement target object 4. The adhesive force Q of the adhesive portion 3B can be decreased and weakened by inserting the adhesive portion 3B by rotating the blade 92 of the change mechanism 9. The adhesive portion 3B has the first adhesive force QB1 stronger than the above-mentioned first pressing pressure PB1. Specifically, the plunger 7B applies the first pressing force PB1 before attaching the measurement target object 4 to the sensor holder 2B and after attaching the measurement target object 4 to the sensor holder 2B. The adhesive portion B3 has the first adhesive force QB1 that is stronger than the peeling force including the first pressing force PB1. The first adhesive force QB1 is an adhesive force that can maintain the sensor holder 2 so as not to come off from the measurement target object 4.

When the measurement by the sensor 5 is completed, the blade 92 inserts the cutting edge 920 into the adhesive portion 3B from one side in the circumferential direction. The blade 92 is inserted into the adhesive portion 3B and then rotated to peel off the adhesive portion 3B so as to decrease and weaken the adhesive force Q. At this time, the adhesive force Q becomes the second adhesive force QB2 of the adhesive portion 3B. The second adhesive force QB2 is weaker than the first adhesive force QB1. Further, the second adhesive force QB2 is weaker than the peeling force. Therefore, the sensor 5 and the sensor holder 2B can be removed from the measurement target object 4 by the peeling force. As described above, the adhesive portion 3B can change the strength of the adhesive force Q with respect to the pressing force P by the blade 92.

According to the present embodiment, the plunger 7B can advance to the upper side Z1 in the direction Z to apply the pressing force P to the sensor 5. Therefore, the sensor 5 can perform the measurement while maintaining the state in which the sensor surface 5a is in contact with the measurement surface 4a even if the measurement target object 4 vibrates.

According to the present embodiment, the plunger 7B can retreat to the lower side 22 in the direction Z to decrease and weaken the pressing force P applied to the sensor 5. Therefore, when the pressing force P is applied too much to the sensor 5, it is possible to adjust the plunger gripping portion 91 so as to apply an appropriate pressing force P to the sensor 5.

Further, according to the present embodiment, the sensor module installation device 10B adheres the sensor 5 and the sensor holder 2B by the adhesive portion 3B while pressing the sensor 5 against the measurement target object 4 by applying the first pressing pressure PB1 by the plunger 7B so as to be maintained not to be separated from the measurement target object 4.

According to the present embodiment, it is possible for the sensor module installation device 10B to detach the sensor 5 and the sensor holder 2B from the measurement target object 4 by pressing the sensor 5 against the measurement target object 4 and applying the second pressing force PB2 that is stronger than the first adhesive force QB1 by the plunger 7B.

According to the present embodiment, the blade 92 is rotatable and is provided to be insertable into the adhesive portion 3B. Therefore, the blade 92 rotates after being inserted into the adhesive portion 3B to decrease and weaken the adhesive force of the adhesive portion 3B, and it is easy to detach the sensor module 1B.

According to the present embodiment, the pressing force application portion 7C or the adhesive portion 3B can relatively change the strength of the force. Therefore, the sensor module installation device 10B can be configured such that the sensor 5 and the sensor holder 2 are attachable to and detachable from the measurement target object 4. Further, the sensor module installation device 10B can easily manage the relationship between the pressing force P and the adhesive force Q.

Fourth Embodiment

Hereinafter, a sensor module installation device including the sensor module according to a fourth embodiment will be described with reference to FIG. 9 and FIG. 10.

In these figures, the same components as the configuration components of the first to third embodiments as shown in FIG. 1 to FIG. 8 are designated by the same reference signs, and the description thereof will be omitted.

Figure 9:
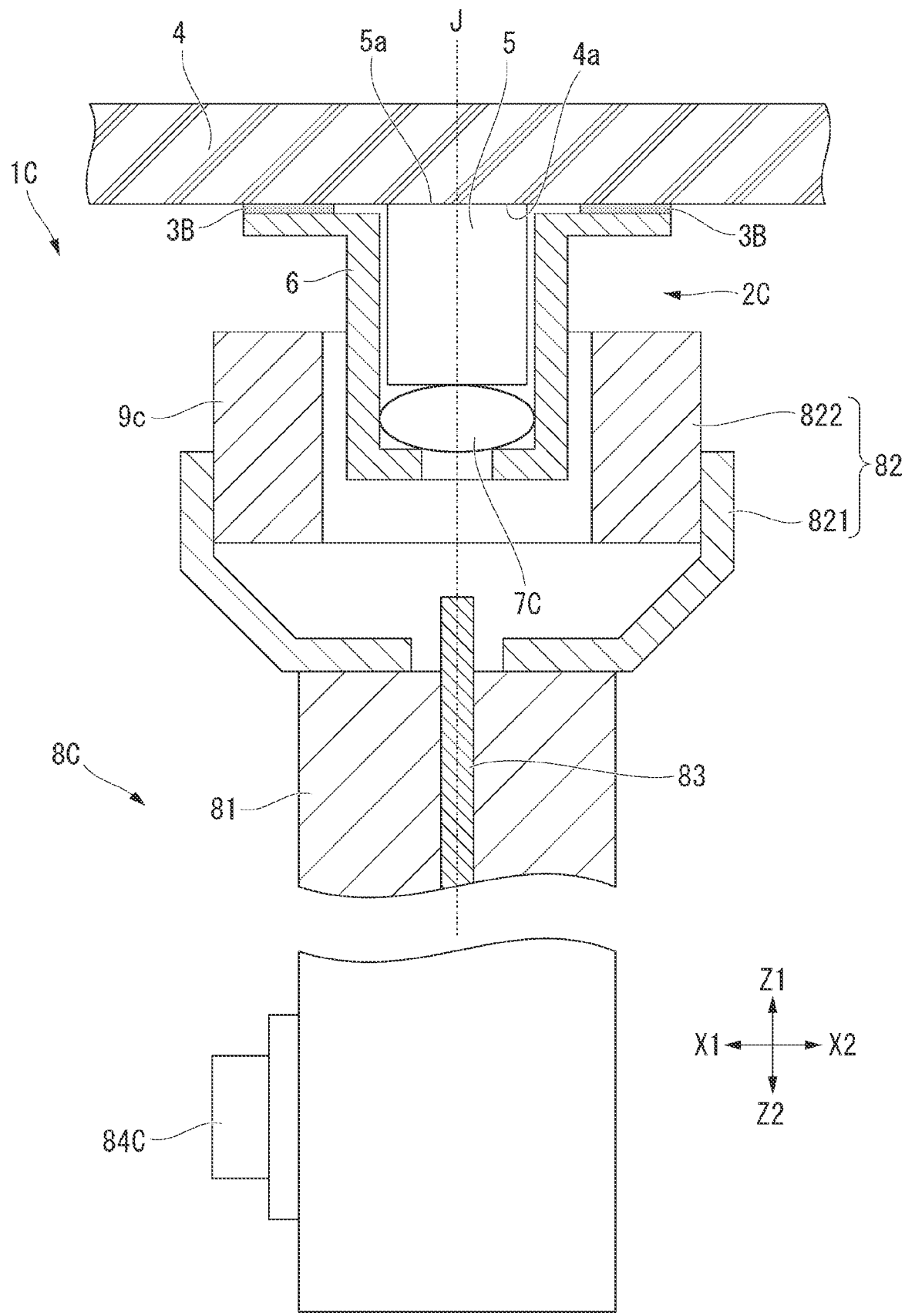
FIG. 9 is an enlarged cross-sectional view showing a sensor module installation device according to a fourth embodiment.

FIG. 9 is an enlarged cross-sectional view showing a sensor module 1C of a sensor module installation device 10C according to the fourth embodiment. FIG. 10 is a view showing a state in which the sensor module 1C of the sensor module installation device 10C in FIG. 9 is detached from the measurement target object 4.

The sensor module installation device 10C has a sensor module gripping portion 8C and a sensor module 1C. The sensor module gripping portion 8C includes a support portion 81, a cup portion 82, a heater portion (change mechanism) 9C, and a rod-shaped member 83. Also, the support portion 81 includes an operation portion 84C. The operation portion 84C can operate the switch for turning on and off the heating of the heater portion 9C.

The heater portion 9C is built in the second cup portion 822. The heater portion 9C is operated by the operation portion 84C. Then, the heater portion 9C heats the concave portion 822a of the second cup portion 822 by a conventional technique to keep the temperature higher than the outside.

Hereinafter, a configuration of the sensor module 1C will be described.

As shown in FIG. 9, the sensor module 1C includes a sensor 5, a sensor holder 2C, and an adhesive portion 3B. The adhesive portion 3B has the same configuration as that of the third embodiment, and includes a first adhesive force QB1 that can maintain the sensor holder 2C so as not to come off from the measurement target object 4. The sensor 5 has the same configuration as that of the first to third embodiments.

Hereinafter, a configuration of the sensor holder 2C will be described.

Figure 10:
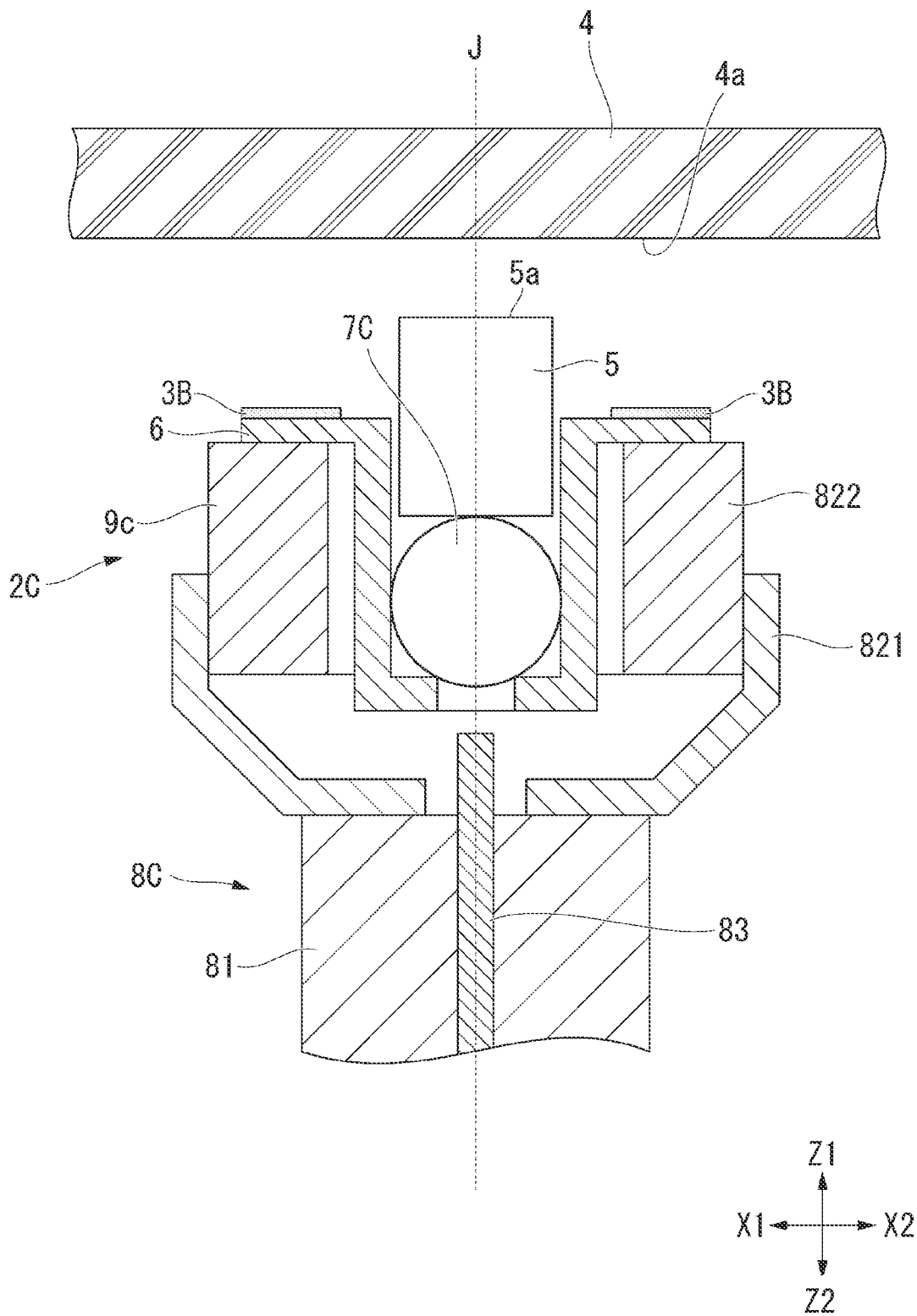
FIG. 10 is a view showing a state in which the sensor module of the sensor module installation device is detached from a measurement target object.

As shown in FIG. 9 or FIG. 10, the sensor holder 2C includes a sensor holder main body 6 and a pressing force application portion 7C. The sensor holder main body 6 has the same configuration as that of the first to third embodiments.

The pressing force application portion 7C is an elastic body containing a gas filled inside. The pressing force application portion 7C is placed on the bottom portion 611 of the sensor holding portion 61. The filled gas is not particularly limited; however, according to the present embodiment, the air is included. The pressing force application portion 7C is formed, for example, in a spherical shape. The shape of the pressing force application portion 7C is not particularly limited. Also, the size of the pressing force application portion 7C is not particularly limited; however, it is preferable that the pressing force application portion 7C is formed with a width thereof in the direction X or the direction Y is smaller than that of the bottom portion 611 such that there is a margin when the pressing force application portion 7C is elastically deformed to be contracted in the direction Z and extended in the direction X or the direction Y.

As shown in FIG. 10, in the pressing force application portion 7C, the sensor 5 protrudes to the upper side Z1 with respect to the sensor holder 2C by an arbitrary protrusion amount in the direction Z in a state in which the sensor 5 is placed on the upper side 21. As shown in FIG. 9, when the sensor module 10 is attached to the measurement target object 4 in this state, the sensor 5 moves to the lower side 22 by the protrusion amount, and the pressing force application portion 7C of the elastic body is elastically deformed in the direction Z by the protrusion amount. At this time, the pressing force application portion 7C presses the sensor 5 against the measurement target object 4 by the restoring force to apply the first pressing force PC1.

When the sensor module 10 is removed, the sensor holding portion 61 of the sensor module 1C is accommodated in the concave portion 822a of the second cup portion 822 of the sensor module gripping portion 8C. At this time, the pressing force application portion 7C is also accommodated in the concave portion 822a of the second cup portion 822. When the concave portion 822a of the second cup portion 822 is heated by the heater portion 9C built in the second cup portion 822, the gas filled in the pressing force application portion 7C expands thermally. The pressing force application portion 7C elastically deforms by the amount of thermal expansion of the gas so as to apply a second pressing force PC2 stronger than the first pressing force PC1 to the sensor 5. According to the present embodiment, the second pressing force PC2 is stronger than the first adhesive force QB1.

Hereinafter, the effect of the sensor module 1C will be described.

The sensor module 1C is installed on the measurement target object 4. The sensor module 1C holds the sensor 5 by the sensor holder 2C. In this state, the pressing force application portion 7C can apply the first pressing force PC1 to the sensor 5, as shown in FIG. 9. At this time, the sensor holder 2C is adhered to the measurement target object 4 by the adhesive portion 3B, and the holding state is maintained. At this time, the adhesive portion 3B has the first adhesive force QB1. The first adhesive force QB1 is stronger than the above-mentioned peeling force. The first adhesive force QB1 is an adhesive force that can maintain the sensor holder 20 so as not to come off from the measurement target object 4. The sensor 5 measures cracks, vibrations, and the like with the above-described configuration.

When the measurement of the sensor 5 is completed and the sensor module 1C is removed, the heater portion 9C heats the concave portion 822a of the second cup portion 822. Then, the gas filled in the pressing force application portion 7C thermally expands. The pressing force application portion 7C elastically deforms by the amount of thermal expansion of the gas, and applies the second pressing force PC2 stronger than the first pressing force PC1 to the sensor 5. The second pressing force PC2 is stronger than the first adhesive force QB1. Therefore, it is possible to detach the sensor 5 and the sensor holder 2B from the measurement target object 4.

According to the present embodiment, since the pressing force application portion 7C is an elastic body, the pressing force P due to the restoring force can be applied while the pressing force application portion 7C is elastically deformed to press the sensor protruding to the upper side Z1 against the measurement target object 4. Accordingly, it is possible for the sensor 5 to perform the measurement while maintaining the state in which the sensor surface 5a is in contact with the measurement surface 4a even if the measurement target object 4 vibrates.

According to the present embodiment, the sensor 5 is pressed against the measurement target object 4 by applying the first pressing force PC1 by the pressing force application portion 7C, and the sensor 5 and the sensor holder 2C are adhered by the adhesive portion 3B such that the sensor holder 2C can be maintained so as not to be separated from the measurement target object 4.

According to the present embodiment, the gas filled in the pressing force application portion 7C is thermally expanded by the heater portion 9C. The pressing force application portion 7C can elastically deform by the amount of thermal expansion of the gas to apply the second pressing force PC2 stronger than the first adhesive force QB1 to the sensor 5. Therefore, it is easy to remove the sensor module 1C.

(Modification Example)

The sensor holder body according to the above-described embodiment may be formed in a cup shape such that the gravity center of the sensor is at the bottom. With this configuration, the risk of the sensor falling can be reduced. It is also desirable that the sensor module is designed such that the sensor does not fall out of the sensor module at all times.

The adhesive portions according to the first embodiment and the second embodiment described above may be a peelable adhesive sheet by decreasing the adhesive force by heating or UV irradiation.

Although the change mechanism according to the fourth embodiment described above is the heater part, the change mechanism may be not the heater part, and the change mechanism may be the feeding portion configured to further feed the gas into the pressing force application portion 7C. The feeding portion connects, for example, a tube or the like to the pressing force application portion, and feeds the gas through the tube. The feeding portion is, for example, an air compressor, an air pump for a bicycle, or the like. Even in this case, the pressing force application portion 7C can expand by the amount of amplification of the gas to apply the second pressing force PC2 stronger than the first adhesive force QB1 to the sensor 5. Therefore, the sensor module 1C can be easily removed.

In the above-described embodiment, an example in which an AE sensor is used as a sensor module or a sensor module installation device that adopts the configuration of the present disclosure has been shown. However, the configuration of the present disclosure may be adopted for other sensors.

According to at least one embodiment described above, the burden of the sensor installation operation can be reduced by having the change mechanism configured to change the relative magnitude relationship between the pressing force and the adhesive force.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor module, comprising:
   a sensor;
   a sensor holder that holds the sensor and includes a pressing force application portion to apply a pressing force to press the sensor toward a measurement target object side;
   an adhesion portion that adheres the sensor holder to the measurement target object by an adhesion force; and
   a change mechanism that changes a relative magnitude relationship between the pressing force and the adhesion force.

2. The sensor module according to claim 1,
   wherein the adhesion portion is an electrically peelable adhesive,
   the electrically peelable adhesive includes a sheet portion and an electrode, and the change mechanism is a voltage application portion that applies a voltage to the electrode to cause a current to flow through the sheet portion so as to lower the adhesion force.

3. A sensor module installation device, comprising:
the sensor module according to claim 1; and
a sensor module holding portion that holds the sensor module.

4. The sensor module installation device according to claim 3, wherein the sensor module holding portion further includes a rod-shaped member that applies the pressing force to press the sensor toward the measurement target object side.

5. The sensor module installation device according to claim 3, wherein the change mechanism further includes a blade that rotates to be inserted into the adhesion portion to decrease the adhesion force.

6. The sensor module installation device according to claim 3, further comprises an operation portion that operates the change mechanism.

7. The sensor module installation device according to claim 3, wherein the sensor module holding portion further includes a rod-shaped member that increases the pressing force.

8. A sensor module installation device, comprising:
a sensor module, comprising:
a sensor;
a sensor holder that holds the sensor and includes a pressing force application portion to apply a pressing force to press the sensor toward a measurement target object side; and
an adhesion portion that adheres the sensor holder to the measurement target object by an adhesion force; and
a sensor module holding portion that holds the sensor module and includes a change mechanism that changes a relative magnitude relationship between the pressing force and the adhesion force.

9. The sensor module installation device according to claim 8,
wherein the adhesion portion is an electrically peelable adhesive,
the electrically peelable adhesive includes a sheet portion and an electrode, and
the change mechanism is a voltage application portion that applies a voltage to the electrode to cause a current to flow through the sheet portion so as to lower the adhesion force.

10. The sensor module installation device according to claim 8,
wherein the pressing force application portion is a plunger, and
the change mechanism is a plunger holding portion that is connected to the plunger to apply a predetermined torque so as to increase the pressing force.

11. The sensor module installation device according to claim 8,
wherein the pressing force application portion includes an elastic body within a gas filled therein, and
the change mechanism is a heater that heats the gas to increase the pressing force.

12. A mounting method of a sensor module for mounting a sensor holder holding a sensor to a measurement target object, comprising:
a step of applying a pressing force to press the sensor to the measurement target object;
a step of adhering the sensor holder to the measurement target object by an adhesion force; and
a step of changing a relative magnitude relationship between the pressing force and the adhesion force.

* * * * *